United States Patent [19]

Hoxey

[11] Patent Number: 5,450,588
[45] Date of Patent: Sep. 12, 1995

[54] REDUCING PIPELINE DELAYS IN COMPILERS BY CODE HOISTING

[75] Inventor: Steven M. Hoxey, Claremont, Canada

[73] Assignee: International Business Machines Corporation, Armonk, N.Y.

[21] Appl. No.: 90,984

[22] Filed: Jul. 12, 1993

Related U.S. Application Data

[63] Continuation of Ser. No. 649,110, Feb. 1, 1991, abandoned.

[30] Foreign Application Priority Data

Feb. 14, 1990 [CA] Canada ............... 2010067

[51] Int. Cl.6 ................................. G06F 9/44
[52] U.S. Cl. .................. 375/700; 364/280.4; 364/280.5; 364/DIG. 1
[58] Field of Search ............. 395/650, 700; 364/280.5, 281.3, 280.4

[56] References Cited

U.S. PATENT DOCUMENTS

| | | | |
|---|---|---|---|
| 4,435,758 | 3/1984 | Lorie et al. | 395/800 |
| 4,642,764 | 2/1987 | Auslander et al. | 395/700 |
| 4,656,583 | 4/1987 | Auslander et al. | 395/700 |
| 4,667,290 | 5/1987 | Goss et al. | 395/700 |
| 4,782,444 | 11/1988 | Munshi et al. | 364/200 |
| 4,858,114 | 8/1989 | Heath et al. | 364/200 |
| 5,021,947 | 6/1991 | Campbell et al. | 395/375 |
| 5,050,068 | 9/1991 | Dollas et al. | 395/375 |
| 5,107,418 | 4/1992 | Cramer et al. | 395/700 |
| 5,119,495 | 6/1992 | King | 395/700 |
| 5,133,072 | 7/1992 | Buzbee | 395/700 |
| 5,202,995 | 4/1993 | O'Brien | 395/700 |

OTHER PUBLICATIONS

Aiken et al., "A Development Environment for Horizontal Microcode", IEEE Trans. on Software Engineering, vol. 14, No. 5, May 1988, pp. 584–594.

Peter Wayner, VLIW: Heir to RISC?, Byte, Aug. 1989, pp. 259–262.

Motorola MC88100 User's Manual, 1989, pp. 1-1 to 1-13.

M. E. Hopkins, A Perspective on the 801/Reduced Instruction Set Computer, IBM Systems Journal, vol. 26, No. 1, 1987 pp. 107–121.

Cooper et al., "The Impact of Interprocedural Analysis and Optimization in the $R^n$ Programming Environment", ACM Tran. on Prog. Lang., vol. 8, No. 4, Oct. 1986, pp. 491–522.

Aho et al., Principles of Compiler Design, Addison-Wesley, 1977, pp. 174–177 & 441–471.

*Primary Examiner*—Kevin A. Kriess
*Assistant Examiner*—Dennis M. Butler
*Attorney, Agent, or Firm*—Mark S. Walker; Wayne P. Bailey

[57] ABSTRACT

This invention permits an optimizing compiler to minimize the effect of pipeline delays, which are typically introduced by branching code. This invention employs code hoisting to introduce computations from lower regions of the flowgraph, into regions where pipeline delays are known to occur.

7 Claims, 6 Drawing Sheets

```
switch(a) { case -1:
    case  0:  case  1:  case  2:  case  3:  case  4:
    case  5:  case  6:  case  7:  case  8:  case  9:
    case 10:  return(a+10);

case 20:  case 21:  case 22:  case 23:  case 24:
    case 25:  case 26:  case 27:  case 28:  case 29:
    case 30:  return(a+20);

case 50:  case 51:  case 52:  case 53:  case 54:
    case 55:  case 56:  case 57:  case 58:  case 59:
    case 60:  case 61:  case 62:  case 63:  case 64:
    case 65:  case 66:  case 67:  case 68:  case 69:
    case 70:  case 71:  case 72:  case 73:  case 74:
    case 75:  case 76:  case 77:  case 78:  case 79:
    case 80:  case 81:  case 82:  case 83:  case 84:
    case 85:  case 86:  case 87:  case 88:  case 89:
    case 90:  return(a+100);
}
```

FIG. 2

| No. | Cycles | Instruction | |
|---|---|---|---|
| (1) | 1 | L | r128=a |
| (2) | 1 | A | r133=r128,1 |
| (3) | 1 | CL | cr134=r133,11 |
| (4) | 3 | BF | CL.2,cr134,1g |
| (5) | 1 | S | r135=r128,20 |
| (6) | 1 | CL | cr136=r135,10 |
| (7) | 3 | BF | CL.3,cr136,1g |
| (8) | 1 | S | r137=r128,50 |
| (9) | 1 | CL | cr138=r137,40 |
| (10) | 3 | BF | CL.4,cr138,1g |
| (11) | 0 | B | CL.5 |
| (12) | 0 | CL.2: | LABEL |
| (13) | 1 | L | r128=a |
| (14) | 1 | A | r129=r128,10 |
| (15) | 1 | RET | r129 |
| (16) | 0 | CL.3: | LABEL |
| (17) | 1 | L | r128=a |
| (18) | 1 | A | r130=r128,20 |
| (19) | 1 | RET | r130 |
| (20) | 0 | CL.4: | LABEL |
| (21) | 1 | L | r128=a |
| (22) | 1 | A | r131=r128,100 |
| (23) | 1 | RET | r131 |
| (24) | 0 | CL.5: | LABEL |

| No. | Cycles | Instruction | |
|---|---|---|---|
| (1) | 1 | L | r128=a |
| (2) | 1 | A | r133=r128,1 |
| (3) | 1 | CL | cr134=r133,11 |
| (5) | 1 | S | r135=r128,20 |
| (6) | 1 | CL | cr136=r135,10 |
| (8) | 1 | S | r137=r128,50 |
| (9) | 1 | CL | cr138=r137,40 |
| (4) | 0 | BF | CL.2,cr134,1g |
| (7) | 0 | BF | CL.3,cr136,1g |
| (10) | 1 | BF | CL.4,cr138,1g |
| (11) | 0 | B | CL.5 |
| (12) | 0 | CL.2: | LABEL |
| (13) | 1 | L | r128=a |
| (14) | 1 | A | r129=r128,10 |
| (15) | 1 | RET | r129 |
| (16) | 0 | CL.3: | LABEL |
| (17) | 1 | L | r128=a |
| (18) | 1 | A | r130=r128,20 |
| (19) | 1 | RET | r130 |
| (20) | 0 | CL.4: | LABEL |
| (21) | 1 | L | r128=a |
| (22) | 1 | A | r131=r128,100 |
| (23) | 1 | RET | r131 |
| (24) | 0 | CL.5: | LABEL |

FIG. 6

| No. | Cycles | Instruction | |
|---|---|---|---|
| (1) | 1 | L | r128=a |
| (2) | 1 | A | r133=r128,1 |
| (3) | 1 | CL | cr134=r133,11 |
| (5) | 1 | S | r135=r128,20 |
| (13) | 1 | L | r128=a |
| (6) | 1 | CL | cr136=r135,10 |
| (4) | 0 | BF | CL.2,cr134,1g |
| (8) | 1 | S | r137=r128,50 |
| (17) | 1 | L | r128=a |
| (9) | 1 | CL | cr138=r137,40 |
| (7) | 0 | BF | CL.3,cr136,1g |
| (21) | 1 | L | r128=a |
| (22) | 1 | A | r131=r128,100 |
| (10) | 0 | BF | CL.4,cr138,1g |
| (11) | 0 | B | CL.5 |
| (12) | 0 | CL.2: | LABEL |
| (14) | 1 | A | r129=r128,10 |
| (15) | 1 | RET | r129 |
| (16) | 0 | CL.3: | LABEL |
| (18) | 1 | A | r130=r128,20 |
| (19) | 1 | RET | r130 |
| (20) | 0 | CL.4: | LABEL |
| (23) | 1 | RET | r131 |
| (24) | 0 | CL.5: | LABEL |

FIG. 7

REDUCING PIPELINE DELAYS IN COMPILERS BY CODE HOISTING

This is a continuation of application Ser. No. 07/649,110, filed Feb. 1, 1991, now abandoned.

FIELD OF THE INVENTION

This invention relates to optimizing compilers. More particularly, it relates to the reduction of pipeline interlock delays introduced by the microprocessor during the execution of certain instructions in a code stream, by inserting selected instructions into a code stream known to contain such delays.

BACKGROUND OF THE INVENTION

Most computers today, particularly Reduced Instruction Set Computer (RISC) systems, use instruction pipelines, which allow the arithmetic logic unit (ALU) to always have at its disposal the next instruction to execute, theoretically allowing a one-to-one correspondence between clock rate and execution speed. Under certain well defined conditions within the hardware, a pipeline interlock prevents execution of a particular instruction until instruction operands are available as results from previous computations. The effect of this interlock may be a lost processing cycle. The most frequent cause for a delay, that is, a lost processing cycle, occurs when processing a conditional branch. At this point all instructions in the pipeline after the branch instruction are potentially nonexecutable, because the branch may direct the control of the program into a different instruction stream; if it does so, they must be replaced by that instruction stream. During this reloading of the pipeline the ALU sits idle waiting for the new instruction stream by means of the action of the interlock. The problem is compounded if the redirected instruction stream immediately contains another conditional branch introducing another potential interlock.

Several attempts have been made in the past to provide a constantly replenished instruction pipeline.

Early RISC machines provide a post-execute form of branch instruction which allows certain instructions, which normally are executed prior to the branch, to appear in the instruction stream after the branch. This makes it possible for some instructions to be executed while the pipeline is being refilled. Such is the case with the IBM[1] RT[2] PC computer system.

[1]Trademark of International Business Machines Corp.
[2]Trademark of International Business Machines Corp.

Finding appropriate instructions to insert between the definition and use point of a condition register, to increase instruction pre-fetch opportunities, forms part of the class of compiler optimizations called *instruction scheduling*, and is part of the background of this invention. Prior art code hoisting techniques generally look for computations which occur along parallel paths of execution and hoist them to a node which dominates both paths. The resulting module is typically smaller in size as a result of replacing two computations with one. This invention employs a refinement of such techniques to find and hoist instructions along paths of conditional execution in order to maintain a full instruction pipeline. The result is that instructions are scheduled across basic block boundaries. The articles below outline some attempts to maintain the instruction pipeline full of executable instructions:

Arya S., Optimal Instruction Scheduling for a Class of Vector Processors: An Integer Programming Approach, *Tech. Rept.* CRL-TR-19-83, Computer Research Laboratory, Univ. of Mich., Ann Arbor, April 1983.

Auslander M. and Hopkins M., An Overview of the PL.8 Compiler, *Proc. ACM SIGPLAN Symp. on Compiler Construction*, Boston, June 1982, pp. 22–31.

Gibbons P. and Muchnick S., Efficient Instruction Scheduling for a Pipelined Architecture, *Proc. SIGPLAN 86 Symp. on Compiler Construction*, Palo Alto, 1986, pp. 11–16.

Gross T. R., Code Optimization of Pipeline Constraints, *Tech. Rept.* 83-255, Computer Systems Lab., Stanford Univ., December 1983.

Hennessy T. L. and Gross T. R., Postpass Code Optimization of Pipeline Constraints, *ACM Trans. on Prog. Lang. and Sys*, Vol. 5, No. 3, July 1983, pp. 422–448.

Sites, R. L., Instruction Ordering for the Cray-1 Computer, *Tech. Rept.* 78-CS-023, Univ. of Calif., San Diego, July 1978.

Research on compile-time pipeline scheduling is relatively sparse. Gibbons et al. (1986), Gross (1983), Hennessey et al. (1983), and Sites (1978) discuss scheduling performed during a pass after code generation and register allocation. Instruction scheduling prior to register allocation has been implemented in several compilers, including the IBM PL.8 compiler described by Auslander et al. (1982), but in all the referenced works scheduling is limited to reducing interlocks only within basic blocks.

Despite these attempts, there remains a need for a way to reduce delays caused by potentially nonexecutable code being present in the instruction pipeline when control in the program flows across multiple basic block boundaries.

SUMMARY OF THE INVENTION

It has now been found that the number of clock cycles during which a microprocessor idles can be reduced by hoisting code found at certain points in a control sequence to other portions of the control sequence. Hoisting is defined as a subclass of code motion techniques, which moves computations from an arbitrary node of a directed graph into a node which dominates the arbitrary node.

Accordingly, the invention comprises a method for improving the use of clock cycles by a sequence of instructions in a computer, comprising:

(a) representing the instructions in a control flowgraph;

(b) searching from first node in the flowgraph to identify subgraphs which are textures of order at least two;

(c) for each texture;
  (i) examining instructions in each child node forming a texture of any order;
  (ii) determining whether each instruction is hoistable; and
  (iii) if the instruction is hoistable, merging the instruction from the child to its parent texture;

(d) continuing steps (i) through (iii) for each child until either all child nodes are exhausted or the delay inherent in the parent is eliminated.

The invention also comprises an improved compiler for optimizing a program to be executed on a computer, comprising:

(a) means for representing the program as a sequence of instructions;

(b) means for representing the control flow of the program in a control flowgraph;

(c) means for searching from the first node in the control flowgraph to identify parent nodes which are textures of order at least two;

(d) means for examining each child node of the parent nodes;

(e) means for determining whether each child node contains an instruction that can be moved into its parent node;

(f) means for moving the instructions into the parent nodes;

(g) means for determining whether all instructions of each of the child nodes have been moved; and (j) means for determining whether a delay inherent in the parent node has been eliminated.

BRIEF DESCRIPTION OF THE DRAWINGS

In figures which illustrate a preferred embodiment of the invention:

FIG. 2 is a C language source code fragment involving a multi-way branch which tests for a value in one of the three ranges: (−1 . . . 10), (20 . . . 30), (50 . . . 90).

FIG. 6 is an optimized intermediate language representation of the source text contained in FIG. 2 after application of the invention.

FIG. 7 is an alternate optimized intermediate language representation of the source text contained in FIG. 2 after application of the invention.

DETAILED DESCRIPTION OF THE PREFERRED EMBODIMENT

Figure 1:
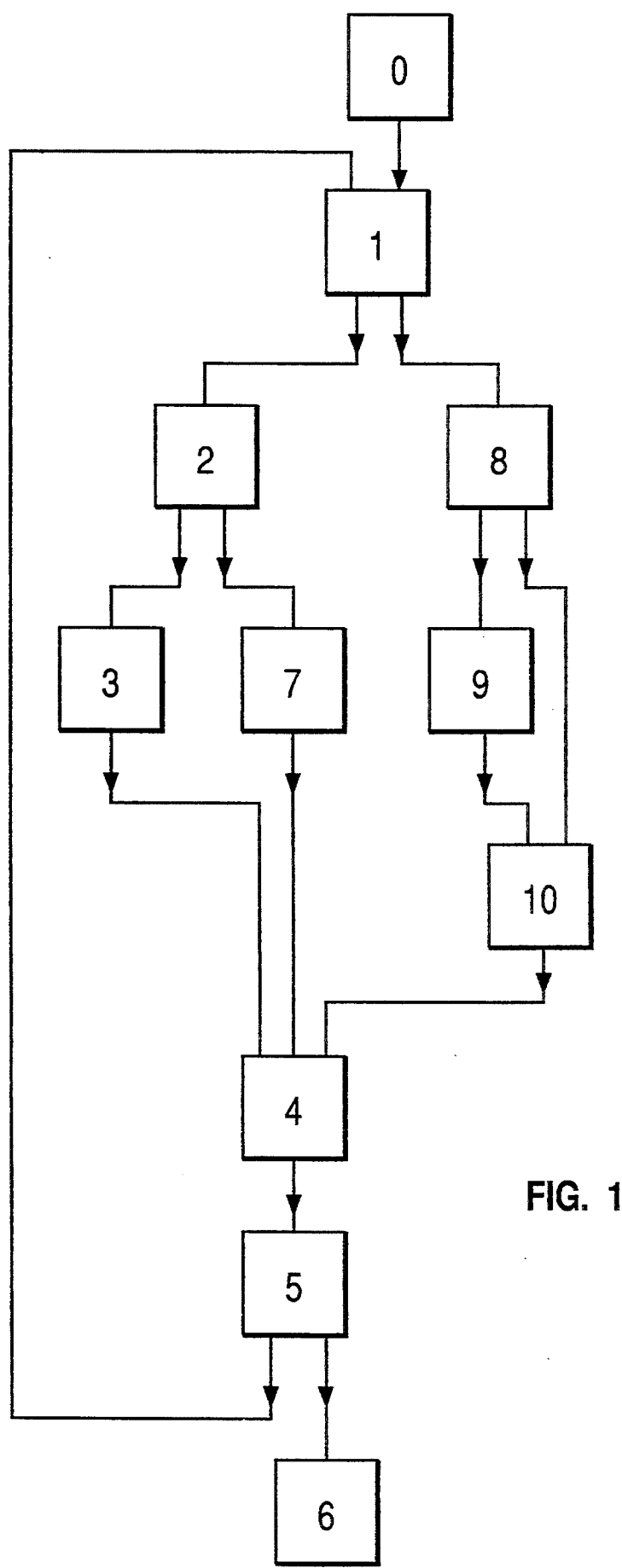
FIG. 1 is a control flowgraph of a fragment of a typical program, having nodes which represent one or more instructions forming basic blocks.

In the disclosure and claims, the following terms, although generally known to the person skilled in the art, are defined herein for clarity. A *basic block* is any sequence of instructions terminated by and inclusive of a branch, return, end of procedure, or the instruction immediately preceding a label or entry point. An *extended basic block* is any sequence of instructions beginning at and inclusive of a procedure entry point, or label and terminated by a subsequent extended basic block boundary or, the end of a procedure. *Collapsing* is an optional process of flowgraph reduction whereby edges are removed and block boundaries extended such that the net result is a flowgraph as defined above, where each node represents an extended basic block rather than a basic block. Reduced flowgraphs, comprised of extended basic blocks rather than basic blocks, may be a necessary precondition for certain other optimizations understood by someone skilled in the art. A *flowgraph* is a directed graph containing all nodes and edges representing the possible flow of control within the subprocedure or function being optimized, each node representing a basic block and each edge representing a possible flow of control. A *back edge* is an edge in a flowgraph which exits an arbitrary node of the flowgraph and enters a node which dominates. *Domination* is the relationship of one node to another such that every path from the initial node of the flowgraph to the dominated node goes through the dominating node. A *subgraph* is a subset of the nodes in a directed graph and all the edges originating or terminating at those nodes. Basic blocks can be divided into two components: a *weave*, and a *web*. The web component being the branch instruction, if one exists, the weave being all other instructions of the basic block. A *weave* is a node in a flowgraph with number of edges entering it, which are designated *entering edges*, and whose sole successor is a *web*. An edge entering an arbitrary node which is also a back edge in the containing flowgraph is not considered to be an entering edge of the node unless that edge originates in the same basic block. A *web* is a node in a flowgraph with a single entering edge and an arbitrary number of exiting edges. By this definition a web is always dominated by a weave. One such exiting edge, designated the *leading edge*, is the edge representing the fall-through path, if one exists, of the last instruction in the web. All other exiting edges shall be designated as *trailing edges*. Order is a term applied to a web which denotes the number of exiting edges. A *texture* is a subgraph containing exactly one weave node and one web node, whose order is defined by the order of the web that it contains and whose entering edges are the entering edges of the weave, e.g. a single entry basic block ending with a conditional branch instruction is a texture of order two. The web component contains only the conditional branch, all preceding instructions in the basic block being the weave components. A *Parent* is a texture of order 2. All successors of parent textures are identified as children. An *eligible child*, hereafter called *child* is a node in a flowgraph which is a successor to an identified parent texture. A child node can be classed as a texture of any order however is only deemed eligible if the parent dominates the child.

When defined according to the definitions above, textures, webs and weaves expose scheduling opportunities, introduced by control flow, to the data flow analysis.

The present invention can be applied at each level at which optimizing steps may be undertaken in compiling a software program, including at the levels of assembler or intermediate language, as will be readily understood by the person skilled in the art. Preferably it is applied at the intermediate language level. An intermediate-level language is, as is known in the art, a step between a high-level language in which a person writes code, often called "source", and machine code in which an actual processor is programmed.

Some newer RISC systems provide multiple condition registers and separate branch decode units which, if compare results are known far enough ahead of the actual conditional branch, can redirect instruction fetching so that the instruction pipeline never contains nonexecutable instructions. The invention is particularly suited to such systems, because more types of instructions are hoistable than with systems that do not separate the branch decoding and arithmetic logic units.

Referring now to FIG. 1, a directed flowgraph illustrates a preferred embodiment of the invention. In the initial step of the method of the invention, a program to be optimized is represented as a sequence of instructions. The program has an inherent flow of control, which is analyzed and is represented by a flowgraph. Beginning at start node 0 and using a depth-first search (DFS) of the flowgraph, those basic blocks are identified which can be classed as textures of order two. In FIG. 1, the nodes are numbered in DFS order to illustrate the order in which they will be examined by the method of the invention. Each of nodes 1, 2, 5 and 8 is a texture of order two since each has two exiting edges.

These nodes will be identified as parents when the optimization defined by this invention is performed. Those successors of the identified parent textures, which may be textures of any order and whose sole predecessor is a parent, are the child nodes of the parents. In FIG. 1, nodes 2 and 8 which are successors of node 1, nodes 3 and 7 which are successors of node 2, nodes 1 and 6 which are successors of node 5, and nodes 9 and 10 which are successors of node 8, are the child nodes of said parent textures.

Each edge in the graph is depicted as exiting from the bottom of an arbitrary node and entering at the top of another arbitrary node. For example, the edge from node 0 to node 1 is said to be exiting node 0 and entering node 1.

Except that the edge between parent texture node 5 and child texture node 1 is a back edge, all parent-child relationships are identical. In this case however, presence of the back edge is sufficient reason to disqualify the weave component of node 1 from being considered to contain eligible candidate instructions when trying to reduce the branch delay inherent in parent texture node 5. Because of the back edge, texture node 5 does not dominate node 1, and therefore node 1 is not an eligible child of texture node 5. Otherwise the weave components of each child are examined alternately for hoistable candidate instructions, until either the weave components of either child are exhausted, or the branch delay inherent in the parent is eliminated. Those instructions which are candidates for hoisting are then merged into the weave component of the parent.

The process of merging components involves concatenating candidate instructions, from the child component to the corresponding parent component. The process of identifying candidate instructions is inherently machine dependent, and as such it will be apparent to the person skilled in the art of writing compilers for the particular machine involved, which instructions will be candidates, given the criteria and methods disclosed herein. However, in most machines some subset of the instruction set which affect only register contents and have no spurious side-effects, can be so hoisted. Optionally, a lookup table is provided for each machine for which the compiler is to be designed. Such a table contains a list of those types of instructions which are hoistable on the particular machine, which can readily be prepared by a person skilled in compiler writing for that machine. During the step of determining whether a given instruction in a code sequence may be hoisted, the lookup table for that machine is consulted to obtain a yes-or-no answer.

If the leading edge of the parent texture is the entering edge of the child and the child weave component is exhausted, then the child is collapsed into the parent by merging the web component of the child with the web component of the parent to form a texture of higher order in the parent. For example, in FIG. 1, one of the child nodes 3 or 7, whichever is on the leading edge, would be collapsed into the parent node 2 if all of the instructions in the child node were exhausted by these hoisting transformations. If the parent's trailing edge is the child's entering edge then the weave component of the child is merged with the weave component of the parent. The web components remain unchanged. It will be apparent to the person skilled in the art that selections from the child nodes may be made sequentially or in some preferential order, depending upon whether the control flow is known to favor one of the child nodes.

A commonly-occurring formation of code is the IF—THEN statement. Expressed in terms of a control flowgraph as illustrated by FIG. 1, the pattern of such a statement appears as a parent texture 8 having two child nodes 9 and 10. The formation shown is of the type in which a parent texture has two child nodes, and one of the child nodes has an entering edge from the other child node. The path through node 9 leads only to node 10, and thus node 10 could be considered to have two parent textures, namely both node 8 and node 9. Node 9 is reached if the condition for the "IF" is satisfied, and node 10 represents the fall-through path if the condition is not satisfied. Node 9 has an order of one, that is, it has only one exiting edge, which leads to node 10. Even though the general rule is that a child node, to be considered for hoisting, must have only one entering edge, nevertheless the "IF—THEN" type of flowgraph pattern can contain hoistable instructions. In many types of programs, a sizable number of such patterns exist, and present a major opportunity for improving a compiled object code program by hoisting according to the method of the invention. When a code pattern as shown in nodes 8, 9 and 10 of FIG. 1 is encountered, a compiler according to the invention can hoist instructions both from node 9 to node 8 and from node 10 to node 8. Hoisting from node 10 to node 9 would not be advantageous even in this special case, because the order of node 9 is one.

It has been shown that programs tend to spend most of their execution time in the most deeply nested paths; therefore a depth-first search is preferably used in the searching step, because it exposes the instruction delays which are likely to occur more frequently. Minimizing these delays first, has the additional benefit that hoisted candidate instruction from deeper levels of the search may also be used to shorten delays in subsequently higher levels of the search. It is in this regard that a depth-first rather than a top-down search is most preferable. A top-down search can be used but will normally require examining all nodes, at all levels, several times, in order to locate all of the instructions that are susceptible to hoisting by the method of the invention.

EXAMPLE 1

In an example of a preferred embodiment of the invention, a RISC machine having multiple condition registers is used. In these examples the candidate instructions for hoisting include: S (subtraction), A (addition), C (arithmetic compare) and CL (logical compare). For simplicity, it will be assumed that all other instructions are non-hoistable. The purpose of applying the invention to the code fragment is to reduce the delay caused by the interlock between the compare instructions and the conditional branches which may redirect program flow to a different instruction stream. Compare instructions define condition registers (crx) which are used in conditional branches BT and BF.

An example of a preferred embodiment of optimization by the method of the invention is a program segment represented by the C program fragment in FIG. 2, which selects a particular action based on the value of a test variable lying within one of the three following ranges: $(-1 \ldots 10), (20 \ldots 30), (50 \ldots 90)$.

Figures 3, 5:
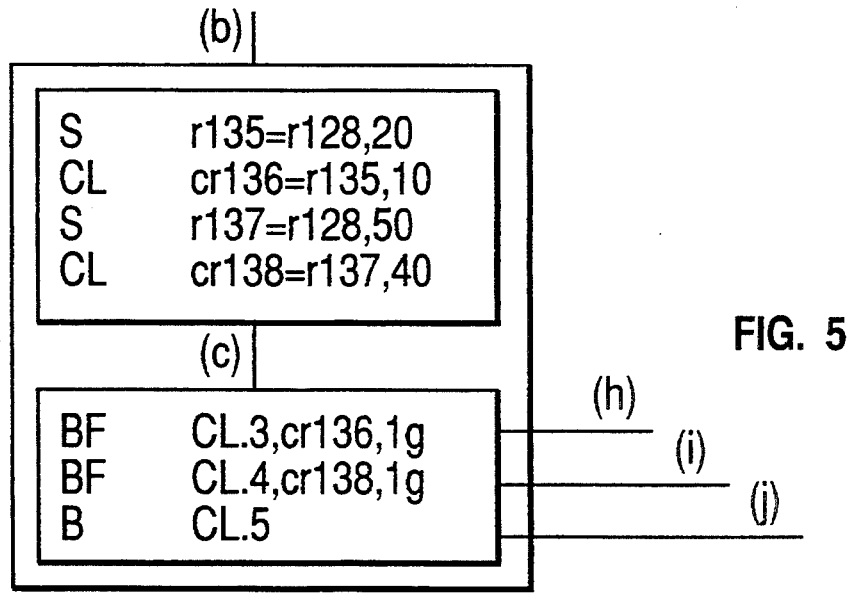
FIG. 3 is a possible intermediate language representation for the source text contained in FIG. 2.
FIG. 5 is a texture at Node 1 after application of the invention to the subgraph rooted at Node 1 in FIG. 4.
Figure 4:
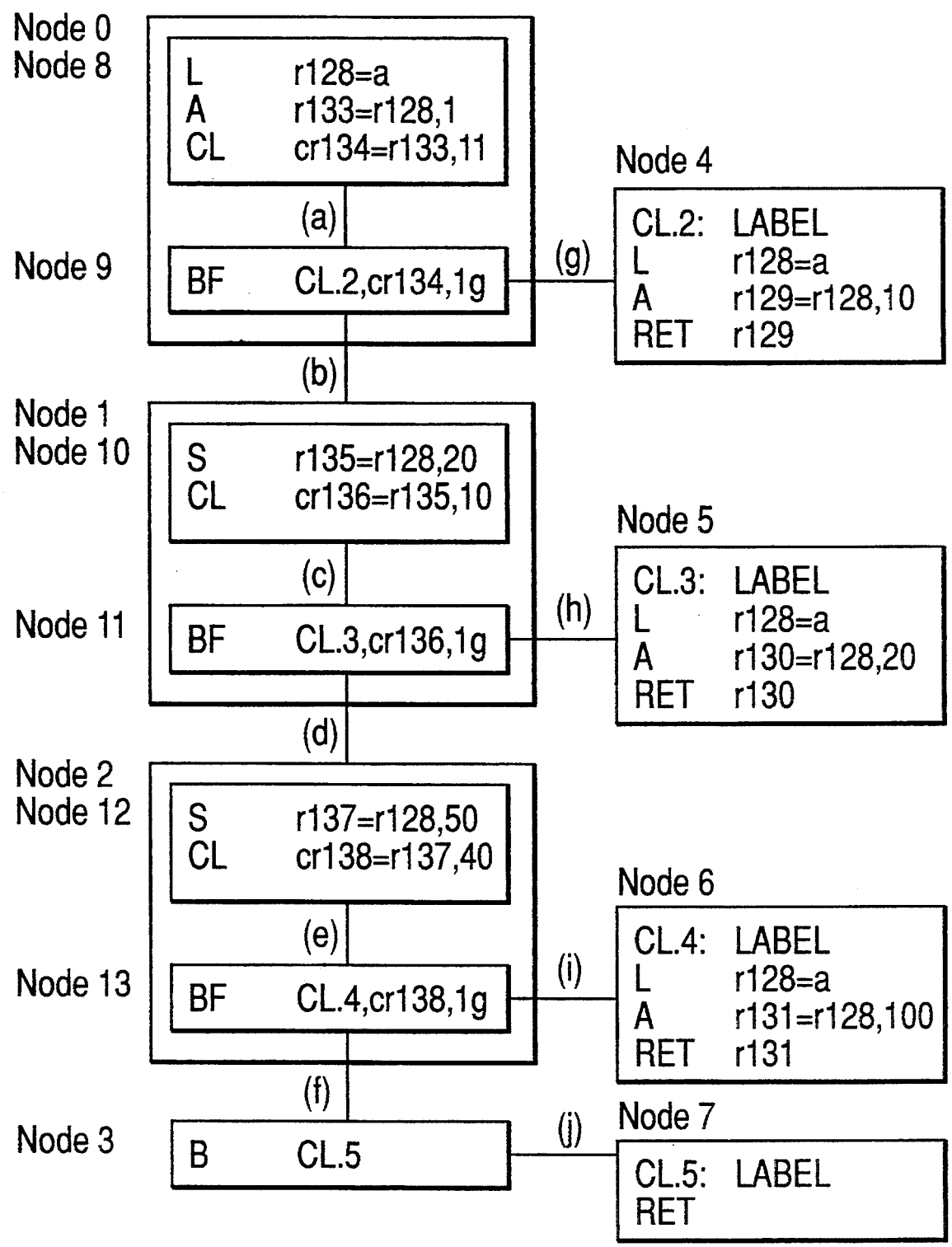
FIG. 4 is a control flowgraph derived from the intermediate language representation of FIG. 3.

In the initial step of compiling, the program to be optimized, shown in C in FIG. 2, is represented as a sequence of instructions, as shown in FIG. 3 in the form of an intermediate code. The flow of control is analyzed and is represented by a flowgraph as illustrated in FIG. 4. Beginning at the start node 0 and using a depth-first search (DFS) of the flowgraph, those basic blocks are identified which can be classed as textures of order two. In FIG. 4, each of node 0, node 1 and node 2 are such textures, each having two exiting edges. For node 0 the exiting edges are those labeled(b) and (g), and for nodes 1 and 2 the exiting edges are (d), (h) and (f), (i) respectively. Further, the edges (b), (d) and (f) are leading edges and edges (g), (h) and (i) are trailing edges.

Each basic block identified as a texture during the DFS is subdivided into its weave and web components. Node 0 is divided into node 8 and node 9. Node 8 is the weave component containing all the instructions except the conditional branch which marked the end of the basic block. Node 9 is the web component which contains only the conditional branch. The edge identified as (a) in FIG. 4 is the edge joining weave and web components of the texture node 0. This edge is characterized by the number of pipeline delay cycles which exist due to the proximity of the conditional branch instruction to the compare instruction which defines the condition register cr134. Referring to the original instruction stream in FIG. 3 at instruction number 4, the delay is seen to be 3 cycles.

During the retreat of the DFS the first texture to be examined in this example is node 2, which is now considered a parent node having child nodes 3 and 6. The edge (e) is also characterized as containing a three cycle delay similar to edge (a) above. The instruction stream of the two child nodes is examined to identify candidate instructions to be hoisted into the weave component, node 12, of texture node 2. In this instance no candidate instructions exist in either child; however node 3, being actually a texture with an empty weave component, satisfies the condition that the parent's leading edge is the entering edge of the child, that being edge (f). Therefore node 3 is collapsed into parent texture node 2 by concatenating the web components, node 13 and node 3, and then removing edge (f).

During the next portion of the DFS retreat, node 1 is considered the parent texture having child nodes 2 and 5. As with node 2 the child nodes are examined for candidate instructions. In this instance none exist in node 5 but the entire contents of node 12, the weave component of texture node 2, are hoistable instructions each of which is hoisted in turn to become part of node 10, the weave of parent texture 1. Weave node 12 now being exhausted, the contents of the child texture are similar to those observed above with regard to nodes 2, 3, and 6. Hence the web components of parent texture node 1 and the child node 2, are collapsed having satisfied the condition that the parent's leading edge is the entering edge of the child with an empty weave. That edge, (d), is then removed. FIG. 5 illustrates the resulting parent texture at this point, which is of order three.

Finally retreating from the DFS to consider texture node 0 and applying the method of the invention to the entire subgraph in the same manner as for nodes 2 and 1, the final, optimized, code stream is shown in FIG. 6, where it is observed that cycle counts for most of the conditional branch instructions have been reduced to zero. For clarity, the original instruction numbers have been preserved in FIG. 6.

EXAMPLE 2

If different constraints on the hoistable instructions are assumed, so that load instructions L are also hoistable, then an alternate code stream would be produced which results from hoisting instructions along the edges (i), (h) and (g) of the flowgraph in FIG. 4. In the previous example the child nodes on these edges, nodes 6, 5 and 4 respectively, were found to contain no candidate instructions for hoisting into nodes 12, 10 and 8, which are respectively the weave components of texture nodes 2, 1 and 0. The constraint on the load, from example 1, placed an indirect constraint on the addition instructions contained in each of these child nodes. The constraint is that since the load could not be hoisted, the addition must not be hoisted since one of the addition operands is not available until the preceding load instruction is completed. Despite additions being hoistable candidates, the addition instruction in this case is dependant on the load and therefore must not be moved ahead of the load. That a constraint of that type applies in a particular environment is clear to the person skilled in the art of programming in that environment. Given that the constraint on the load instruction is relaxed, the addition can now be hoisted provided the load is also hoisted. Referring to FIG. 7, the resulting code stream, it can be seen that one such addition was hoisted, instruction number 22. Following this further optimization, the delay on the conditional branch instruction, 10, is reduced to zero, compared to one cycle when the previous constraint was in force.

EXAMPLE 3

Below is another simpler example in which a branch delay of two instructions rather than three has been eliminated.

| C Fragment |
| --- |
| ... |
| if(x==1) goto lab1 |
| if(x==25) goto lab25 |
| if(x==10) goto lab10 |
| if(x==99) goto lab99 |
| ... |

| | Initial Intermediate Code | | | Final Intermediate Code | |
| --- | --- | --- | --- | --- | --- |
| 1 | L | r200=x | 1 | L | r200=x |
| 1 | C | cr100=r200,1 | 1 | C | cr100=r200,1 |
| 2 | BT | lab1,cr100,eq | 1 | C | cr101=r200,25 |
| 1 | C | cr101=r200,25 | 1 | C | cr102=r200,10 |
| 2 | BT | lab25,cr101,eq | 0 | BT | lab1,cr100,eq |
| 1 | C | cr102=r200,10 | 1 | C | cr103=r200,99 |
| 2 | BT | lab10,cr102,eq | 0 | BT | lab25,cr101,eq |
| 1 | C | cr103=r200,99 | 0 | BT | lab10,cr102,eq |
| 2 | BT | lab99,cr103,eq | 0 | BT | lab99,cr103,eq |

EXAMPLE 4

Another example follows in which a branch delay of two instructions is eliminated. Here the ST instruction represents a store into a variable. In this example assume that some other optimization, known to someone skilled in the art, has discovered that for efficiency the values of variables a, b and c should be preloaded into registers r100, r200 and r300 respectively, on all paths of execution leading to the user specified label LL. This results in a pipeline delay which can only be removed by application of the method of the invention since the basic block containing the delay contains no schedulable instructions.

| C fragment |
| --- |
| LL: ... <br> if(a==1) a=b+c; <br> d=b−c; <br> ... |

| Initial Intermediate Code | | | | Final Intermediate Code | | |
| --- | --- | --- | --- | --- | --- | --- |
| 0 | LL: | LABEL | | 0 | LL: | LABEL |
| 1 | C | cr400=r100,1 | | 1 | C | cr400=r100,1 |
| 2 | BT | L.1,cr400,eq | | 1 | A | r500=r200,r300 |
| 1 | A | r500=r200,r300 | | 1 | S | r600=r200,r300 |
| 1 | ST | a=r500 | | 0 | BT | L.1,cr400,eq |
| 0 | L.1: | LABEL | | 1 | ST | a=r500 |
| 1 | S | r600=r200,r300 | | 0 | L.1: | LABEL |
| 1 | ST | d=r600 | | 1 | ST | d=r600 |

In the prior art, code reordering prior to the allocation of registers has been discouraged, for several reasons. First, scheduling tends to increase register lifetimes making it more difficult to obtain a "good" register allocation since long register lifetimes tend to introduce extra register spill code. Secondly, certain interlock properties which exist between instructions may not be known until after register assignment is complete. Thirdly, if the optimization is performed at the time of generating code, each compiler must implement some form of the optimization, particularly if different intermediate codes are used. Techniques applied after register allocation and instruction selection can, however, be applied to hand-coded assembly code.

The present invention overcomes these drawbacks by means of providing several benefits. Even though register lifetimes are lengthened, the nature of this lengthening is due to their *definition point* being hoisted to a higher node of the flowgraph, not just earlier in some straight line code. This is similar to the effect of moving computations outside of loops, or at least farther away from the center of a *jam region* (region of greatest register resource utilization). Register spill code, if it occurs as a result of this hoisting, is then likely to be inserted higher in the flowgraph when *live range splitting* is used to shorten jam regions. Secondly, modern machines typically employ larger register sets than older equipment, and if sufficient registers are available, most programs will not contain any spill code. Within the preferred embodiment, no new interlock situations are introduced by the register allocation process which are not known prior to it. Because of the growing trend toward high level languages and the use of general purpose optimizers and code generators, the cost of multiple implementations described above is fast becoming insignificant. The method of the invention is usable with any optimizing compiler, and has been tested with several compilers having a single optimizer and code generator, for example FORTRAN, C, PASCAL and PL.I.

Relative performance gains in test cases tend to vary greatly depending on the amount of cycle time lost due to these kinds of pipeline delays. In test cases containing a reasonable amount of pipeline delay, performance gains can be seen to be as high as 30%. The cost at compile time is proportional to the number of opportunities exploited plus the fixed overhead of the search, which together typically represent less than 1% of the compile time. As stated above, a depth-first search is preferable to a top-down search because it locates the most frequently executed delay reducing hoisting opportunities first. As well, a depth-first search has less overhead than a top-down search.

Although the scheduling technique of the invention does execute computations hoisted from conditional paths of execution, regardless of the actual execution path ultimately selected by the program, this is more than outweighed by the advantage that those cycles that are required to compute the hoisted computations would otherwise have been lost completely. If by way of some externally provided data, the probabilities of certain execution paths are known at compile time, then the technique can easily be modified by methods known to the person skilled in the art to favor hoisting from the appropriate side of the conditional control path.

What is claimed is:

1. A method in a data processing system for improving utilization of clock cycles for a sequence of computer instructions, comprising:
   a. representing, by said data processing system, said computer instructions in a control flowgraph, said control flowgraph comprising at least one subgraph, said at least one subgraph comprising at least one parent texture, said at least one parent texture having at least one child node related thereto;
   b. searching, by said data processing system, said control flowgraph to identify subgraphs which are textures of order at least two;
   c. for any identified subgraph:
      i. examining, by said data processing system, instructions in at least one child node of said identified subgraph;
      ii. determining, by said data processing system, whether each instruction is hoistable; and
      iii. if said instruction is hoistable, merging, by said data processing system, said instruction from said child node to its parent texture.

2. A method as claimed in claim 1, further comprising the step of determining, by said data processing system, whether all instructions in a child node have been moved into a parent texture, and if so, then collapsing said child node into said parent texture.

3. A method as claimed in claim 1, in which said texture comprises a parent texture having two child nodes, and one of said child nodes has an entering edge from the other of said child nodes.

4. A method in a data processing system for improving utilization of clock cycles for a sequence of computer instructions, comprising:
   a. representing, by said data processing system, said computer instructions in a control flowgraph, said control flowgraph comprising at least one subgraph, said at least one subgraph comprising at least one parent texture, said at least one parent texture having at least one child node related thereto;
   b. searching, by said data processing system, said flowgraph to identify subgraphs which are textures of order at least two;
   c. for any identified subgraph;

i. examining, by said data processing system, instructions in at least one child node of said identified subgraph;
ii. dletermining, by said data processing system, whether each instruction is hoistable; and
iii. if said instruction is hoistable, merging, by said data processing system, said instruction from said child node to its parent texture;

d. continuing steps i) through iii) for each child node until either all candidate instructions from child nodes are exhausted or all delay inherent in said parent is eliminated.

5. A method as claimed in claim 4, further comprising the step of determining, by said data processing system, whether all instructions in a child node have been moved into a parent texture, and if so, then collapsing said child node into said parent texture.

6. A method as claimed in claim 4, in which said texture comprises a parent texture having two child nodes, and one of said child nodes has an entering edge from the other of said child nodes.

7. A method as claimed in any of claims 1 to 6, wherein said step of determining, by said data processing system, whether an instruction is hoistable comprises the steps of selecting a lookup table for a specific machine on which said improvement is to be performed, said lookup table including a list of instructions hoistable on said machine, and determining whether said instruction is found in said lookup table.

* * * * *